United States Patent
Bugenhagen

(10) Patent No.: US 7,590,069 B1
(45) Date of Patent: Sep. 15, 2009

(54) TESTING AN ACCESS LINK BETWEEN A SERVICE PROVIDER AND A CUSTOMER

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 707 days.

(21) Appl. No.: 11/394,000

(22) Filed: Mar. 30, 2006

(51) Int. Cl.
  *H04L 12/26* (2006.01)
(52) U.S. Cl. ........................... 370/241; 714/712
(58) Field of Classification Search ............ None
  See application file for complete search history.

(56) References Cited

U.S. PATENT DOCUMENTS

| | | | |
|---|---|---|---|
| 6,941,243 B1* | 9/2005 | Maciona et al. ............ | 702/182 |
| 2002/0039352 A1* | 4/2002 | El-Fekih et al. ............ | 370/252 |
| 2002/0165952 A1* | 11/2002 | Sewell et al. ............... | 709/224 |
| 2004/0107213 A1* | 6/2004 | Zubeldia et al. ........... | 707/104.1 |
| 2005/0254432 A1* | 11/2005 | Bertin et al. ................ | 370/241 |
| 2006/0133286 A1* | 6/2006 | Elie-Dit-Cosaque et al. | 370/249 |
| 2007/0076616 A1* | 4/2007 | Ngo et al. ................... | 370/241 |
| 2007/0234139 A1* | 10/2007 | Kalantri et al. ............. | 714/712 |
| 2007/0282883 A1* | 12/2007 | Bolstad et al. .............. | 707/101 |

* cited by examiner

*Primary Examiner*—Min Jung

(57) ABSTRACT

A test system for testing an access link between a service provider network and a customer network comprises an interface and a processing system. The interface is configured to transmit a test request to a device located in the customer network and receive a response from the device indicating a traffic description. The processing system is configured to generate test data based on the traffic description, generate a test file having the test data contained in the test file. The interface is further configured to transmit the test file to the device and receive test traffic transmitted by the device over the access link wherein the device generates the test traffic based on the test data contained in the test file. The processing system is further configured to process the test traffic to determine a status of the access link.

20 Claims, 6 Drawing Sheets

TESTING AN ACCESS LINK BETWEEN A SERVICE PROVIDER AND A CUSTOMER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to testing access links provided by an access provider between a service provider and a customer.

2. Description of the Prior Art

Telecommunication customers, such as enterprise or residential customers, often times will have customer premise equipment, such as a modem or packet switch, installed at their customer site. Service providers typically provide services to the customer, such voice or data services, over a third party access network that links the customer and the service provider. Increasingly, access is being provided by cable multi-service operators (MSO).

In the past, in order to test a service or an access link, a service provider would transmit a packet stream to the CPE located at the residence. Either the CPE or the computer connected to the CPE would loop-back the stream. The service provider would know the characteristics of the incoming stream and would therefore expect a particular pattern from the outgoing stream. However, the advent of Ethernet based access networks has hindered the ability of performing loop-back testing. In particular, if the incoming MAC is the same as the outgoing MAC, the stream is blocked by a filter in the access network. As a result, the test stream cannot reach the test system and the testing of the access link is inhibited.

SUMMARY OF THE INVENTION

An embodiment of the invention helps solve the above problems and other problems by providing systems, methods, and software for testing an access link between a service provider and a customer without requiring a loop-back at the customer site. Rather, test data is encapsulated within a test file and transmitted from the service provider to the customer. At the customer location, a device or equipment generates test traffic based on the test data in the test file. The device or equipment transmits the test traffic back to a test system in the service provider network. The test system is able to compare the test traffic to the patterns in the original test data in order to determine the performance or status of the access link.

In an embodiment of the invention, a method of operating a test system to test an access link between a service provider network and a customer network comprises transmitting a test request to a device located in the customer network, receiving a response from the device indicating a traffic description, generating test data based on the traffic description, generating a test file having the test data contained in the test file, transmitting the test file to the device, receiving test traffic transmitted by the device over the access link wherein the device generates the test traffic based on the test data contained in the test file, and processing the test traffic to determine a status of the access link.

In an embodiment of the invention, processing the test traffic to determine the status of the access link comprises comparing the test traffic to the test data.

In an embodiment of the invention, the access link comprises an Ethernet link.

In an embodiment of the invention, the Ethernet link is provided over a cable network.

In an embodiment of the invention, the test request identifies a node in the customer network and wherein the traffic description identifies traffic associated with the node.

In an embodiment of the invention, a test system for testing an access link between a service provider network and a customer network comprises an interface and a processing system. The interface is configured to transmit a test request to a device located in the customer network and receive a response from the device indicating a traffic description. The processing system is configured to generate test data based on the traffic description, generate a test file having the test data contained in the test file. The interface is further configured to transmit the test file to the device and receive test traffic transmitted by the device over the access link wherein the device generates the test traffic based on the test data contained in the test file. The processing system is further configured to process the test traffic to determine a status of the access link.

In an embodiment of the invention, a communication system for testing an access link between a service provider network and a customer network comprises a test system in the service provider network and a device in the customer network and in communication with the test system. The test system is configured to transmit a test request to a device located in the customer network, receive a response from the device indicating a traffic description, generate test data based on the traffic description, generate a test file having the test data contained in the test file, and transmit the test file to the device. The device is configured to receive the test request, generate the response indicating the traffic description, transmit the response to the test system, receive the test file, generate test traffic based on the test data, and transmit the test traffic to the test system over the access link. The test system is configured to receive the test traffic and process the test traffic to determine a status of the access link.

In an embodiment of the invention, a software product for operating test system to test an access link between a service provider network and a customer network comprises software operational when executed by a computer system to direct the computer system to transmit a test request to a device located in the customer network, receive a response from the device indicating a traffic description, generate test data based on the traffic description, generate a test file having the test data contained in the test file, transmit the test file to the device, receive test traffic transmitted by the device over the access link wherein the device generates the test traffic based on the test data contained in the test file, and process the test traffic to determine a status of the access link. The software further comprises a storage medium configured to store the software.

BRIEF DESCRIPTION OF THE DRAWINGS

The same reference number represents the same element on all drawings.

DETAILED DESCRIPTION OF THE PREFERRED EMBODIMENT

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

In an embodiment of the invention, a logging mechanism is provided in a device located at a customer location that logs the type of traffic being sent out of the network and characteristics of the traffic. In the event of a problem, a central test system located in a service provider network requests a traffic description from the device. The central test system then creates a sample packet flow based on the log, wraps the flow into a file, such as an FTP file, and sends the file to the CPE device. The device then recreates a new traffic stream based on the data in the FTP file. The service provider can then monitor the outgoing stream in order to trouble shoot the problems experienced by the customer. In this manner, the outgoing stream from the CPE will not have the same MAC because the stream will not be a loop-back stream from the service provider. However, the service provider will know what type of data to expect from the outgoing stream and will be able to test the performance of the access network and still avoid the MAC filters.

Figure 1:
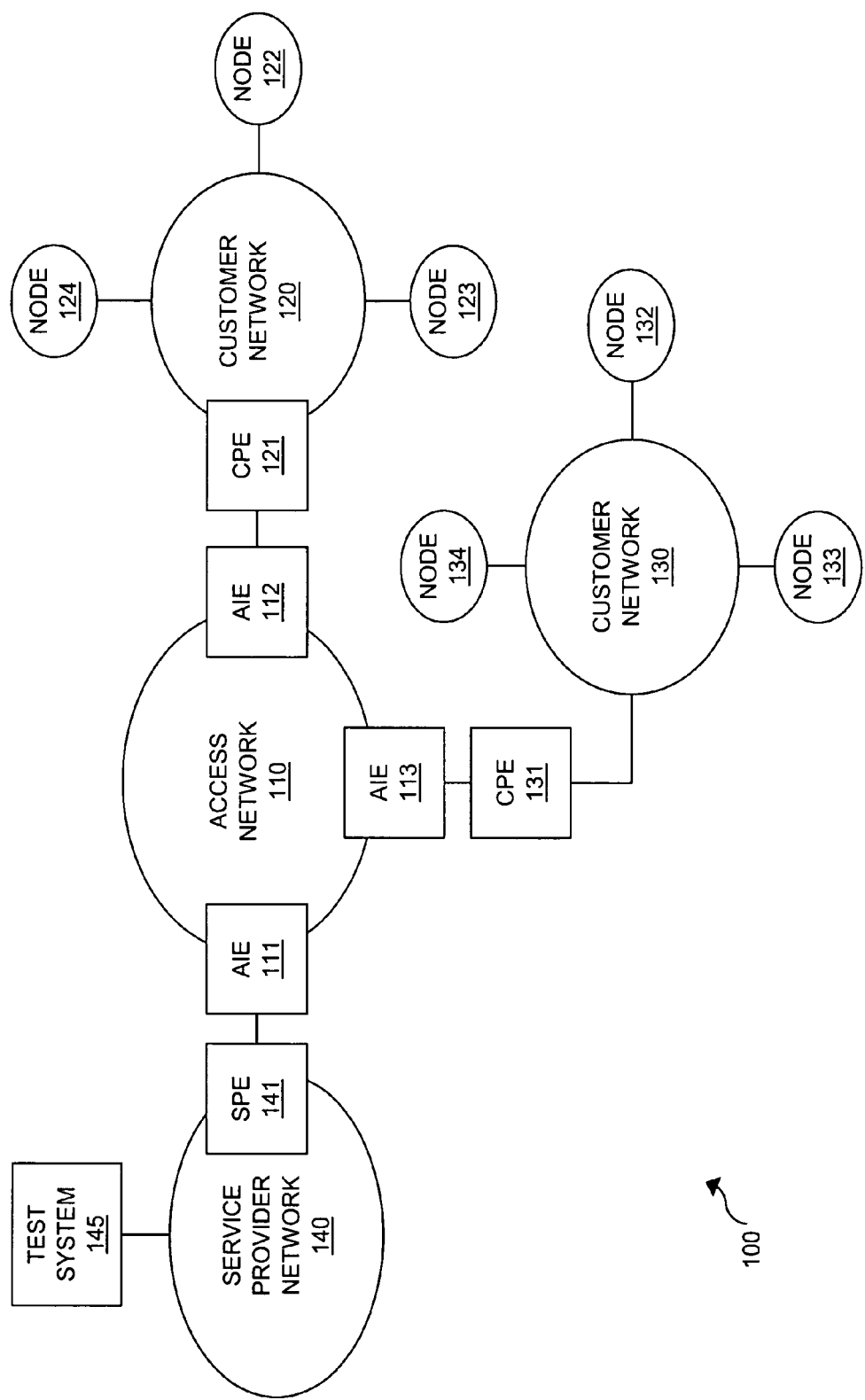
FIG. 1 illustrates a communication network in an embodiment of the invention.

FIG. 1 illustrates a functional block diagram of a communication network 100 in an embodiment of the invention. Communication network 100 includes access network 110, customer network 120, customer network 130, and service provider network 140. In this example, access network 110 is an Ethernet based access network, such as one operated by a cable MSO. Access network 110 is coupled to customer network 120 by access interface equipment (AIE) 112 and customer premises equipment (CPE) 121. Customer network 120 also includes nodes 122, 123, and 124. Access network 110 is coupled to customer network 130 by AIE 113 and CPE 131. Customer network 130 includes nodes 132, 133, and 134. Service provider network 140 is coupled to access network 110 by AIE 11 and service provider equipment 141. Service provider network 140 includes test system 145.

Figure 2:
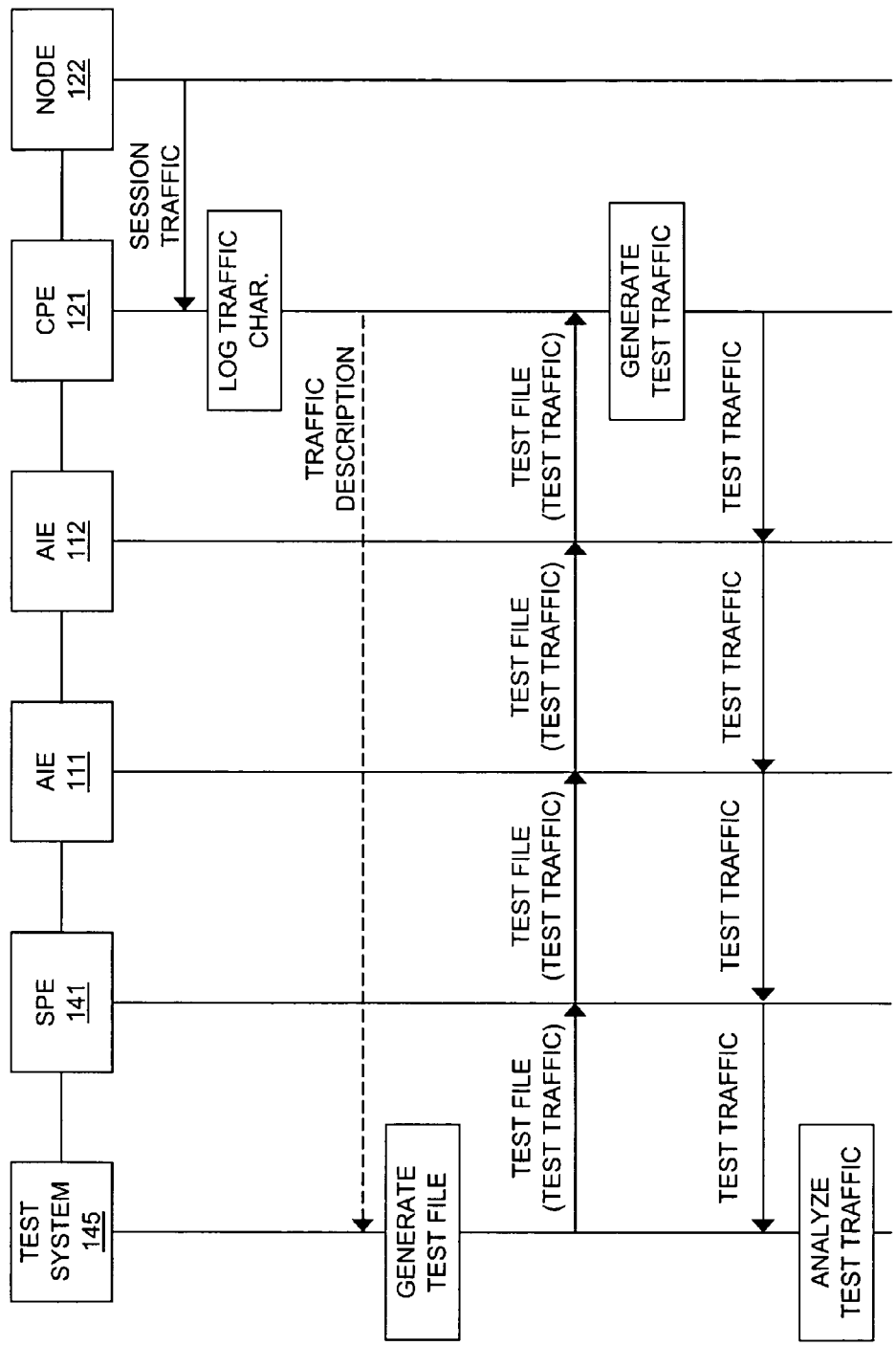
FIG. 2 illustrates a flow diagram in an embodiment of the invention.

FIG. 2 illustrates a flow diagram in an embodiment of the invention describing the flow between elements of FIG. 1. First, a node 122 in customer network 120 transmits session traffic to CPE 121. The session traffic could be any kind of traffic, such as voice, video or data traffic. While not illustrated in FIG. 1, the traffic typically could be transmitted over access network 110 to a destination, such as service provider network 140. Service provider network 140 could then forward the traffic to its eventual destination, such as the public Internet, the public switched telephone network (PSTN), or another customer network. Upon receiving the session traffic, CPE 121 logs characteristics of the traffic. For example, CPE 121 could log origination and destination information, the type of the traffic, or the size and bandwidth of the traffic.

At any point during operation, the customer could experience a service problem. For instance, the user operating node 122 could register a complaint that the session traffic is not adequately reaching its intended destination. In response, a service or test request could be lodged with the service provider that operates service provider network 140. In response to the complaint, test system 145 could transmit a test request to CPE 121 identifying either the user, the node 122, or the session to be tested. CPE 121 could responsively determine a traffic description for the test based on the information stored in the log and transmit the traffic description to test system 145.

Upon receiving the traffic description, test system 145 could generate test data based on the traffic description. For example, test system 145 could generate test data corresponding to the type, size, or bandwidth of the traffic for which the complaint was registered. Test system 145 could then generate a test file and insert the test data into the test file. Test system 145 could transfer the test file having the test data contained within to CPE 121.

Upon receiving the test file, CPE 121 could process the test data to generate simulated test traffic based on the test data. In one example, CPE 121 could insert the media access control (MAC) address or network address of node 122 into the test traffic. CPE 121 could then transmit the test traffic to test system 145. Once the test traffic has been received at test system 145, the test traffic can be analyzed to determine if the access link over access network 110 is causing the service problem experienced at node 122.

Figure 3:
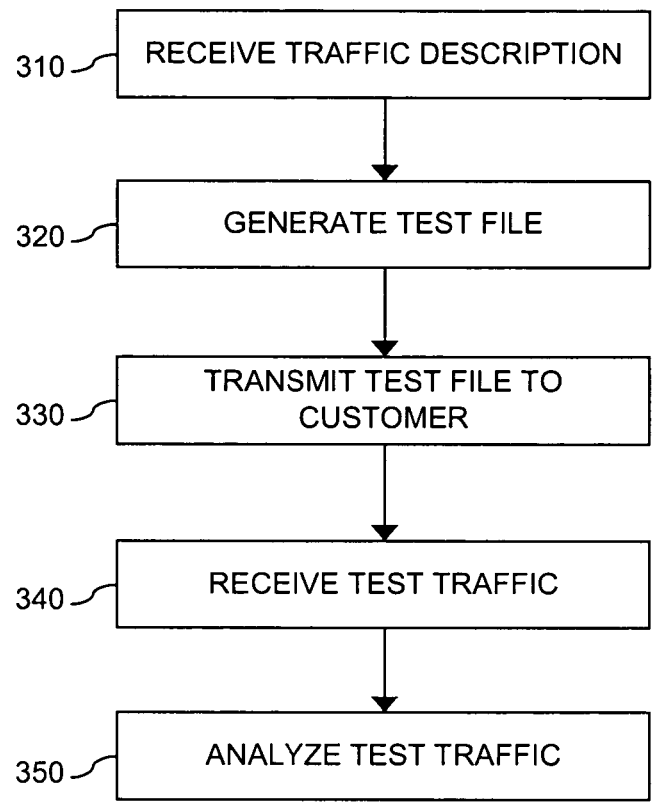
FIG. 3 illustrates a process in an embodiment of the invention.

FIG. 3 illustrates a process 300 for the operation of test system 145. To begin, test system 145 receives the traffic description from CPE 121 (Step 310). Test system 145 processes the traffic description to generate a test file containing test data that corresponds to the traffic description (Step 320). Test system 145 then transmits the test file to the customer, and in particular to a CPE device such as CPE 121 (Step 330). Next, test system 145 receives the test traffic over the access link (step 340). The test traffic can then be analyzed to determine the status of the access link (Step 350). For instance, test system 145 could determine whether the access link is congested, down, or functioning properly.

Figure 4:
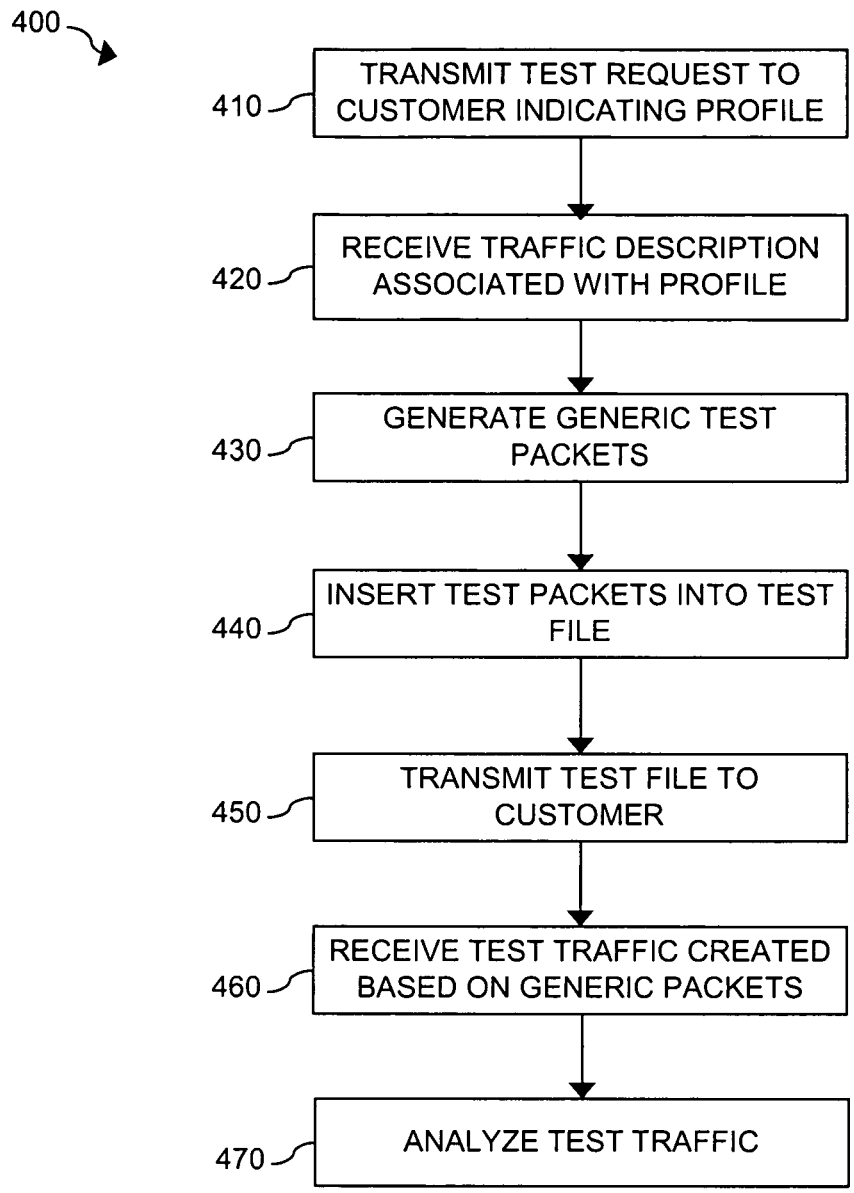
FIG. 4 illustrates a process in an embodiment of the invention.

FIG. 4 illustrates a process 400 for the operation of test system 145. To begin, test system 145 transmits a test request to a customer, such as CPE 121, indicating a profile (Step 410). The profile could indicate a traffic type to be tested or a particular user or node to be tested, as well as other profiles. In response, test device 145 receives a traffic description from the customer describing traffic associated with the indicated profile (Step 420). Test system 145 processes the traffic description to generate test packets corresponding to the traffic description (Step 430) to insert into a test file (Step 440). Next, test system 145 transmits the test file to the customer, and in particular to a CPE device such as CPE 121 (Step 450). Test system 145 receives back the test traffic over the access link (step 460). The test traffic can then be analyzed to determine the status of the access link (Step 470). For instance, test system 145 could determine whether the access link is congested, down, or otherwise functioning properly.

Figure 5:
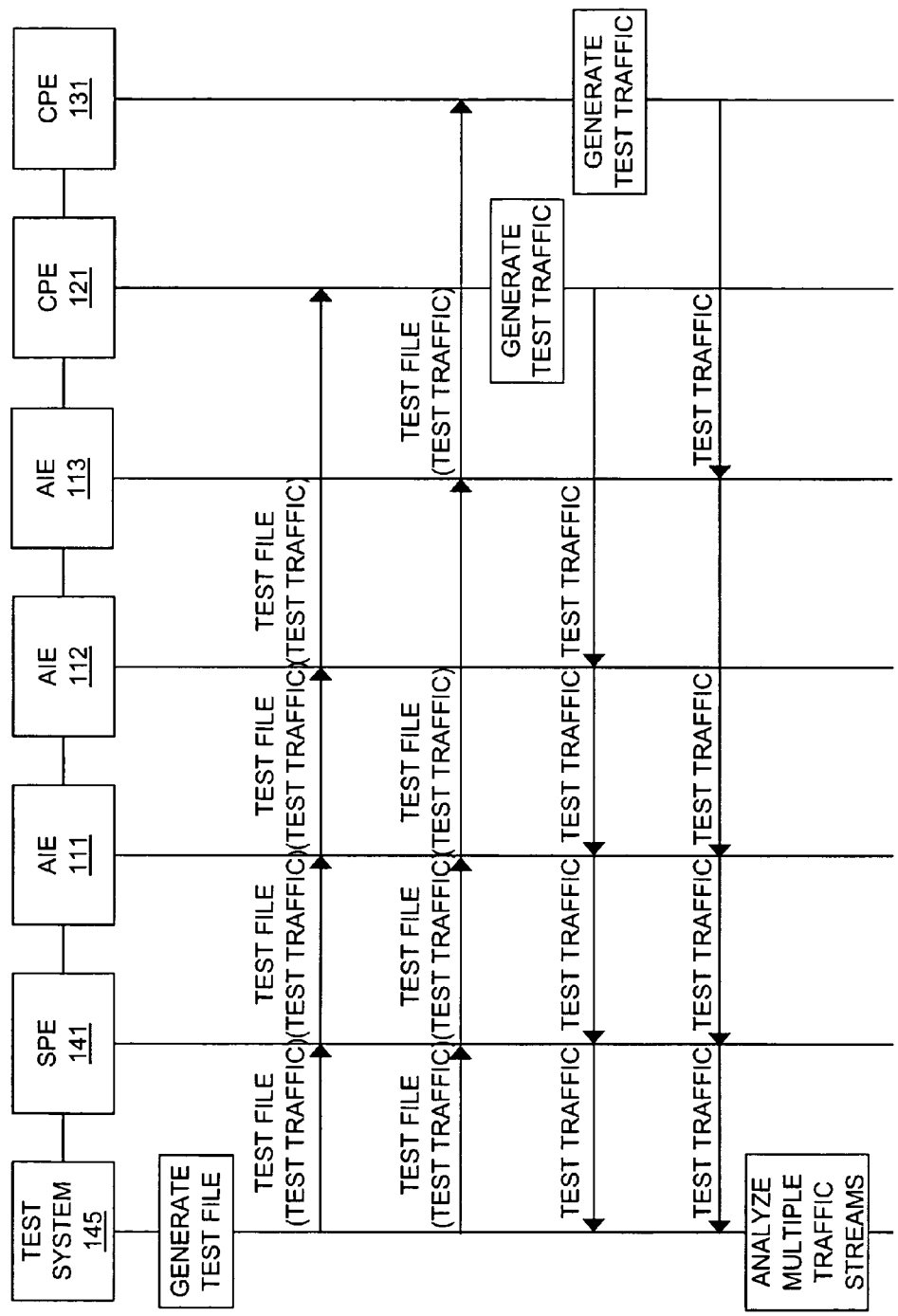
FIG. 5 illustrates a flow diagram in an embodiment of the invention.

FIG. 5 is a flow diagram illustrating the operation of communication network 100 in an embodiment. In this embodiment, test system 145 initiates a dual-test to two different customer networks 120 and 130. In particular, test system 145 transmits the same test file to CPE 121 and CPE 131. In response, both CPE 121 and CPE 131 generate test traffic based on the test data contained within the test file. CPE 121 and CPE 131 then also both transmit the test traffic respectively to test system 145. Upon receiving both streams of test traffic, test system 145 can analyze the multiple test traffic to determine the performance of each customer network 130 and 120 relative to the other.

Advantageously, communication network 100 allows test system 145 to test the operation of an access link over access network 110 without having to transmit a test stream to devices located at customer locations and without having to perform a loop-back test. Rather, the test data is transferred from test system 145 to CPE 121 within a file. CPE 121 generates test traffic based on the test data and transmits the test traffic to test system 145. As a result, a filter in access network 110 will not be triggered because the outgoing test traffic stream will be an original stream, rather than a looped-back stream.

Figure 6:
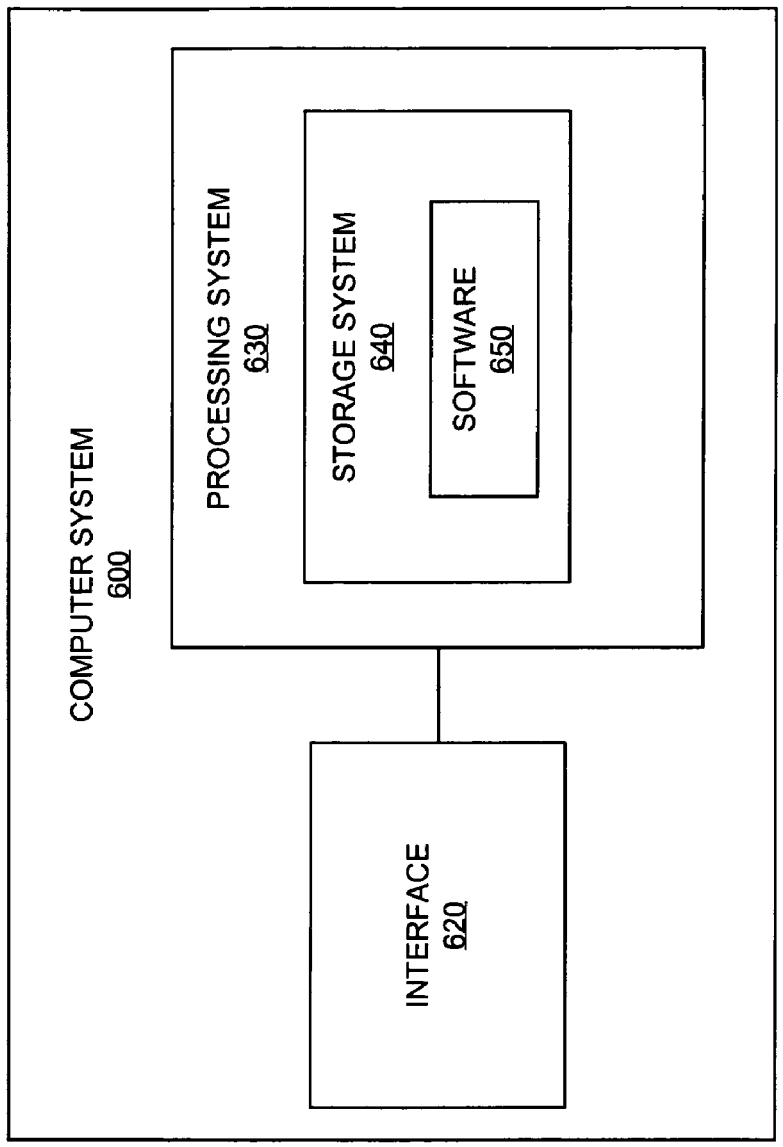
FIG. 6 illustrates a computer system in an embodiment of the invention.

FIG. 6 illustrates computer system 600 in an embodiment of the invention. Computer system 600 includes interface 620, processing system 630, storage system 640, and software 650. Storage system 640 stores software 650. Processing system 630 is linked to interface 620. Computer system 600 could be comprised of a programmed general-purpose computer, although those skilled in the art will appreciate that programmable or special purpose circuitry and equipment may be used. Computer system 600 may use a client server architecture where operations are distributed among a server system and client devices that together comprise elements 620-650.

Interface 620 could comprise a network interface card, modem, port, or some other communication device. Signaling interface 620 may be distributed among multiple communication devices. Interface 630 could comprise a computer microprocessor, logic circuit, or some other processing device. Processing system 630 may be distributed among multiple processing devices. Storage system 640 could comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a general-purpose computer. Software 650 could also comprise an application program, firmware, or some other form of machine-readable processing instructions. When executed by the processing system 630, software 650 directs processing system 630 to operate as described for remote service testing systems 200, 400, and 500. Also when executed by the processing system 630, software 650 directs processing system 630 to operate as described for test system 145.

What is claimed is:

1. A method of operating a test system to test an access link between a service provider network and a customer network, the method comprising:
   transmitting a test request to a device located in the customer network;
   receiving a response from the device indicating a traffic description;
   generating test data based on the traffic description;
   generating a test file having the test data contained in the test file;
   transmitting the test file to the device;
   receiving test traffic transmitted by the device over the access link wherein the device generates the test traffic based on the test data contained in the test file; and
   processing the test traffic to determine a status of the access link.

2. The method of claim 1 wherein processing the test traffic to determine the status of the access link comprises comparing the test traffic to the test data.

3. The method of claim 1 wherein the access link comprises an Ethernet link.

4. The method of claim 3 wherein the Ethernet link is provided over a cable network.

5. The method of claim 1 wherein the test request identifies a node in the customer network and wherein the traffic description identifies traffic associated with the node.

6. A test system for testing an access link between a service provider network and a customer network, the test system comprising:
   an interface configured to transmit a test request to a device located in the customer network and receive a response from the device indicating a traffic description;
   a processing system configured to generate test data based on the traffic description, generate a test file having the test data contained in the test file;
   the interface further configured to transmit the test file to the device and receive test traffic transmitted by the device over the access link wherein the device generates the test traffic based on the test data contained in the test file; and
   the processing system further configured to process the test traffic to determine a status of the access link.

7. The test system of claim 6 wherein the processing system is configured to compare the test traffic to the test data to determine the status of the access link comprises.

8. The test system of claim 6 wherein the access link comprises an Ethernet link.

9. The test system of claim 8 wherein the Ethernet link is provided over a cable network.

10. The test system of claim 6 wherein the test request identifies a node in the customer network and wherein the traffic description identifies traffic associated with the node.

11. A communication system for testing an access link between a service provider network and a customer network, the communication system comprising:
    a test system in the service provider network; and
    a device in the customer network and in communication with the test system;
    wherein the test system is configured to transmit a test request to a device located in the customer network, receive a response from the device indicating a traffic description, generate test data based on the traffic description, generate a test file having the test data contained in the test file, and transmit the test file to the device;
    wherein the device is configured to receive the test request, generate the response indicating the traffic description, transmit the response to the test system, receive the test file, generate test traffic based on the test data, and transmit the test traffic to the test system over the access link; and
    wherein the test system is configured to receive the test traffic and process the test traffic to determine a status of the access link.

12. The communication system of claim 11 wherein the test system is configured to compare the test traffic to the test data to determine the status of the access link comprises.

13. The communication system of claim 11 wherein the access link comprises an Ethernet link.

14. The communication system of claim 13 wherein the Ethernet link is provided over a cable network.

15. The communication system of claim 11 wherein the test request identifies a node in the customer network and wherein the traffic description identifies traffic associated with the node.

16. A software product for operating test system to test an access link between a service provider network and a customer network, the software product comprising:

software operational when executed by a computer system to direct the computer system to transmit a test request to a device located in the customer network, receive a response from the device indicating a traffic description, generate test data based on the traffic description, generate a test file having the test data contained in the test file, transmit the test file to the device, receive test traffic transmitted by the device over the access link wherein the device generates the test traffic based on the test data contained in the test file, and process the test traffic to determine a status of the access link; and a storage medium configured to store the software.

17. The software product of claim 16 wherein the software is operational when executed by the computer system to direct the computer system to compare the test traffic to the test data to determine the status of the access link comprises.

18. The software product of claim 16 wherein the access link comprises an Ethernet link.

19. The software product of claim 18 wherein the Ethernet link is provided over a cable network.

20. The software product of claim 16 wherein the test request identifies a node in the customer network and wherein the traffic description identifies traffic associated with the node.

\* \* \* \* \*